United States Patent [19]

Johnson et al.

[11] 3,740,760

[45] June 19, 1973

[54] REACTION END-POINT RECORDER FOR USE WITH A ROTARY ANALYTICAL PHOTOMETER

[75] Inventors: Wayne F. Johnson, Loudon; William R. Miller, Oak Ridge, both of Tenn.

[73] Assignee: The United States of America as represented by the United States Atomic Energy Commission, Washington, D.C.

[22] Filed: Nov. 9, 1971

[21] Appl. No.: 196,900

[52] U.S. Cl. ............................ 346/74 E, 346/35
[51] Int. Cl. .................. G01r 23/18, G01d 5/243
[58] Field of Search ............ 340/174.1 A, 174.1 G; 346/74 ES, 74 M, 74 E, 74 SB, 74 SC, 33 R, 35; 324/77 D, 77 E

[56] References Cited

UNITED STATES PATENTS 3,611,411 10/1971 Moshier ........................... 346/74 E
3,631,509 12/1971 Marshall .......................... 346/74 E

*Primary Examiner*—Vincent P. Canney
*Attorney*—Roland A. Anderson

[57] ABSTRACT

An analog data recording system has been provided for recording data values from a rotary analytical photometer. The system comprises means for scanning the range of data values, comparing the data values with the instantaneous value of a logarithmic scan voltage and energizing individual marking means that are synchronized with the scan when the voltage value of the scan equals the individual data voltage value.

10 Claims, 1 Drawing Figure

PATENTED JUN 19 1973
3,740,760
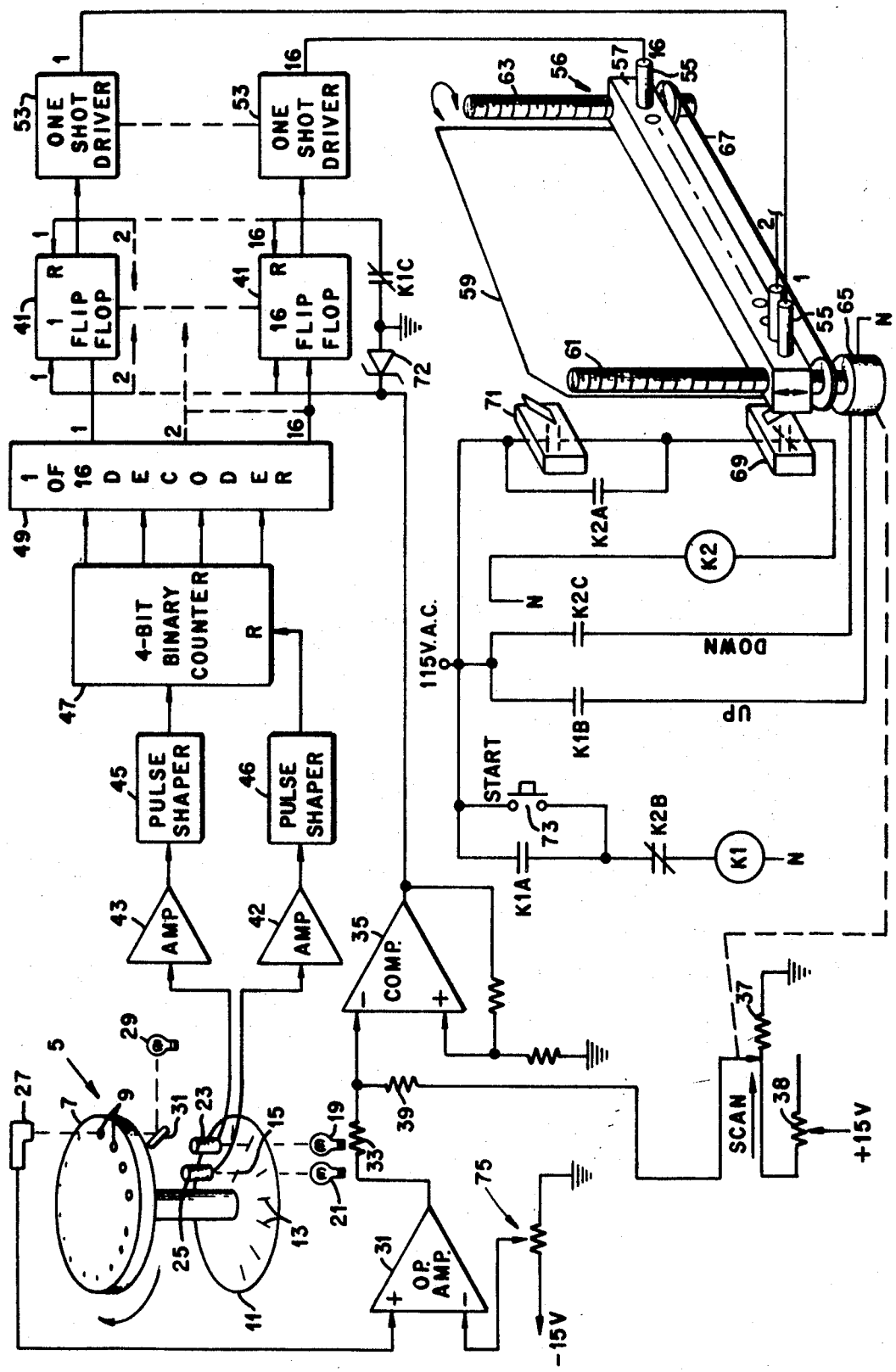

REACTION END-POINT RECORDER FOR USE WITH A ROTARY ANALYTICAL PHOTOMETER

BACKGROUND OF THE INVENTION

The present invention was made during the course of, or under, a contract with the U. S. Atomic Energy Commission.

This invention relates generally to analog recording apparatus for use with data acquisition systems and more specifically to an analog recording system for use with an analytical photometer wherein the data values are in the form of a continuously repeating train of pulses.

In the past, various means have been provided for recording data values from photometric analyzers of the high speed, parallel type, such as that disclosed in U. S. Pat. No. 3,555,284, issued Jan. 12, 1971, and having a common assignee with the present application. In these machines a plurality of discrete samples in individual glass or plastic cuvettes are moved past stations where additions, reactions, or measurements occur. Typically, the cuvettes are formed in a rotating assembly having a plurality of stations around the circumference designed to hold reagents, catalysts, standards, or samples under test. As the assembly is accelerated, all samples and reagents are mixed simultaneously in the cuvettes. The light transmission of the mixtures is then measured by passing light through the cuvettes as they pass a measuring station where a light detector, such as a photomultiplier tube, generates a pulse for each cuvette as it passes the station. These pulses are in the form of a continuously repeating train of pulses, each pulse amplitude representing the light transmittance of each cuvette sample or standard as the case may be.

It has been the practice to use a digital computer with an appropriate interfacing system to allow direct read-in of sample data. The computer is programmed to perform various necessary computations for desired data reduction and readout.

More recently, attention has turned to smaller versions of the above machines for use in laboratories where access to a digital computer is not practical or feasible. Accordingly, the present invention is the result of an effort to provide an inexpensive apparatus for recording analytical photometer data values, particularly apparatus to record the values of a run on a single card.

SUMMARY OF THE INVENTION

In view of the above-state need it is an object of this invention to provide a simple and inexpensive analog data recording apparatus for use in recording the individual amplitude of a repeating train of data pulses.

Another object of this invention is to provide an analog recording apparatus having a plurality of recording channels corresponding to the number of data pulses in a repeating train of pulses which records the amplitude of each of these pulses in respective channels.

Yet another object of this invention is to provide an analog recording apparatus as in the above objects for use with a high-speed photometric analyzer which records data in the form of sample concentration by a logarithmic conversion from measured sample transmittance values.

Briefly, the invention comprises a means for receiving a repeating train of data pulses of varying amplitude and comparing the amplitude of each data pulse with a scanning reference voltage to generate an output when the amplitude of a data pulse equals or exceeds that of the reference voltage, a means for generating reference pulses synchronized with the data pulses and repeatedly sequentially generating enabling pulses to a plurality of separate gating inputs corresponding to the number of data pulses of the repeating train of pulses, and a plurality of gating means equal to the plurality of outputs of said reference pulse generating means, each of the gating means having a trigger input connected to the output of the comparator means and an enabling input connected to respective outputs of reference pulse generating means so that a pulse is provided at the output of each gate the first time a pulse is applied to the trigger input, indicating that a data signal has exceeded the reference voltage. A recorder is provided that includes a linearly movable carriage having a plurality of electrically operated markers connected to respective outputs of the gating means so that a record card is marked in the appropriate channel at a distance from a reference position to indicate its amplitude as the carriage moves over the record card, and a drive means which drives the carriage and a variable voltage divider to provide the scanning reference voltage.

Other objects and many of the attendant advantages of the present invention will be obvious from the following detailed description of the invention taken in conjunction with the drawing, wherein the single FIGURE is a schematic diagram of an analog recording apparatus according to the present invention.

DETAILED DESCRIPTION

Referring now to the drawing, a portion of the photometric analyzer, as described in the above-referenced U. S. Pat. No. 3,555,284, is shown schematically and generally indicated by reference number 5. The analyzer rotor 7 is power driven by a conventional drive means (not shown). Disposed within the rotor 7 are a plurality of sample-containing cuvette chambers, one below each of the light path defining holes 9. The rotor 7 has attached thereto, for synchronous rotation therewith, a synchronization disc 11. The disc 11 has a plurality of slotted openings 13 radially positioned adjacent the periphery of the disc 11. Each slot 13 is in a particular alignment with a corresponding one of the plurality of cuvette chambers so as to provide a synchronizing pulse, here termed the cuvette pulse, during the passing of a cuvette past a sensor position. The disc 11 is also provided with one slot 15 which is aligned with the rotor 11 at a radial position inward of the slots 13 so as to provide an additional pulse, here termed the rotor pulse, as the rotor spins. This slot 15 is aligned so that the rotor pulse occurs slightly before the illumination of cuvette in position No. 1 on the rotor 7.

In order to provide the cuvette pulses and the rotor pulse, a pair of photodetectors 23 and 25 are mounted so as to view light from sources 19 and 21, respectively, directed through the slots 13 and 15. Each time a slot 13 passes the sensor or measuring position a cuvette pulse is generated and once each revolution a rotor pulse is generated when slot 15 passes the measuring position to indicate the first of the train of data pulses from the analyzer.

A third photodetector 27 is disposed above the rotor 5 and aligned to sense light transmitted through the cuvettes during rotation from a light source 29 and a mirror 31 disposed below the rotor assembly and oriented to reflect the light beam upward, substantially normal to the plane of rotation of the rotor. The photodetector 27 may be a photomultiplier tube or photocell disposed directly above the cuvette circle at the sensor or measuring position to receive light transmitted through axially aligned openings 9. Each time a cuvette opening 9 passes the measuring position, a data pulse is generated whose amplitude is indicative of the light transmittance of the sample relative to a standard or blank cuvette.

The output of photomultiplier 27 is connected to the non-inverting input of an operational amplifier 31 whose inverting input is connected to a bias network 75. The output of amplifier 31 is connected through a summing resistor 33 to the input of a comparator 35. The input of comparator 35 is also connected to the motor driven wiper of a logarithmic potentiometer 37 by means of a summing resistor 39. The logarithmic potentiometer 37 provides a logarithmically varying reference voltage connected to a positive voltage source by means of a variable calibrating resistor 38 whose function will be described hereinbelow.

The two inputs to comparator 35 are connected to its inverting input and its output is connected to a zener diode 72. The output of comparator 35 is held at zero volts by diode 72 when the sum of the inputs to comparator 35 is positive, and when this sum is negative, the output of comparator 35 is at the proper signal level for the circuitry which follows. Thus so long as the sum of the input voltage to comparator 35 is positive (reference voltage greater than data pulses) the output is at zero volts. When the input signal goes negative, as when one of the data pulses exceeds the reference voltage, a fixed amplitude positive pulse is generated for the duration of the data pulse.

The output of the comparator 35 is connected to the trigger inputs of a plurality of J-K flip-flops 41, in this case 16, of which only the first and last (16th) are shown in order to simplify the drawing.

Referring again to the analyzer 5, the cuvette pulses detected by photodetector 23, which are generated synchronously with the particular data signal pulses, are applied to the input of an amplifier 43 which drives a pulse shaper 45. The pulse shaper 45 provides a fixed duration pulse for each input pulse which activates a binary counter 47 to increase the count by one for each cuvette pulse. Counter 47 is a 4-bit counter, thus having a 16 count capacity. Each of the 4 counter bits is connected to a sixteen channel decoder 49. The decoder 49 is of conventional design wherein one of sixteen outputs is activated in accordance with the binary code count registered by the counter 47. The sixteen outputs of the decoder 49 are connected, respectively, to the enabling inputs of flip-flops 41.

Since the pulses to be recorded are repeating, it is necessary to reset the circuit each time the last rotor cuvette position passes the measuring station. This is accomplished by the rotor pulse at the output of photodetector 25 which is connected to an amplifier 42 which drives a pulse shaper 46. The output of the pulse shaper 46 is connected to the reset input of the counter 47 which resets the counter 47 to its initial state of an output of bit 1 at the beginning of each revolution of the rotor 7.

The set outputs of flip-flops 41 are connected to individual one-shot solenoid drivers 53. Each of the drivers 53 includes a pair of transistors with a positive feedback R-C network to stretch the activating pulse duration to produce the desired pulse to drive the solenoid coils 55. The outputs of drivers 53 are connected, respectively, to the drive coils of sixteen solenoid actuated pens 55. The pens 55 are mounted in a carriage 57 of a recorder 56 which is adapted for travel over a record card 59 so that when the ssolenoid of a pen is activated it will print a mark in the corresponding one of sixteen channels indicated on the card 59.

The carriage 57 is driven linearly along the card by means of drive screws 61 and 63 adapted for threaded engagement of the carriage at opposite ends thereof. Drive screw 61 is connected to the shaft of a reversible motor 65 which drives both screws by means of a belt drive 67 connected between screws 61 and 63. The movement of the carriage is controlled by limit switches 69 and 71. Switch 69 is a normally closed switch (i.e., closed when not being activated by the carriage) while switch 71 is a normally open switch, as indicated schematically in the drawing.

Limit switches 69 and 71 are connected in series with a relay K2 and the series circuit is connected across the 115 volt AC supply. Relay K2 has two sets of normally open contacts, K2A and K2C, and one set of normally closed contacts, K2B. Contacts K2A are connected in parallel with limit switch 71. A second relay K1 is connected in series between the supply and neutral with the normally closed contacts K2B and a momentary push start switch 73. Relay K1 has two sets of normally open contacts, K1A and K1B, and one set of normally closed contacts, K1C. Contacts K1A are connected in parallel with start switch 73 so that, when switch 73 is pushed to start a recording scan, relay K1 is activated and locked in by the closing of contacts K1A. Contacts K1B are connected between the voltage supply and the "up" input of motor 65, so that the closing of contacts K1B causes the motor to turn counterclockwise, driving the carriage up. Contacts K2C of relay K2 are connected between the voltage supply and the down input of motor 65 so that the closing of contacts K2C causes the motor to rotate clockwise driving the carriage down once it has reached limit switch 71. When the carriage 57 reaches limit switch 71, it closes, thereby energizing relay K2 (switch contacts 69 being normally closed) and in turn opening contacts K2B causing relay K1 to drop out. Contacts K2C are closed and contacts K1B are opened, thereby causing the motor 65 to reverse and drive the carriage 57 down to the start position. Since contacts K2A are closed, relay K2 remains locked in until the carriage reaches the lower limit switch 69. When switch 69 opens, relay K2 drops out and a print cycle is completed.

It will be noted that contacts K1C are connected between the reset (R) input of flip-flops 41 and ground so that at any time that K1 is not energized contacts K1C are closed applying ground potential to the reset inputs, thereby resetting the flip-flops to start another scan.

During operation, an external device such as the photometric analyzer 5 is repeatedly presenting the following signals: a train of sixteen negative going data pulses normally within the range of 0–10 V to the input of non-inverting amplifier 31; a train of sixteen sequence identifying (reference) pulses, as in this case the cuvette pulses in synchronism with the data pulses to the input of amplifier 43; and a single pulse for identification (rotor pulse) that occurs just prior to the first of the train of sixteen data pulses and applied to the set input of amplifier 42.

Assuming that the system has been calibrated by setting the potentiometer 38 at a value corresponding to the light transmittance of a known standard, such as water, the rotor is placed in rotation and the start switch 73 depressed momentarily to start the recorder 56 scanning sequence as described above. When motor 65 starts, the carriage 57 begins to move up and the scanning arm of the logarithmic potentiometer 37 begins to move toward a decreasing positive voltage.

Since the motor 65 speed moves relatively slow compared to the speed of the rotor 7 of analyzer 5, the voltage of potentiometer 37 will not have changed significantly and no recording will be made prior to the application of the first rotor pulse from detector 25. This pulse re sets the counter 47 so that the first cuvette pulse is counted in the proper sequence and applies the proper code to decoder 49. As the scan continues, eventually the positive voltage from potentiometer 37 will reach a value which compares to the amplitude of a negative data pulse from amplifier 31 and will cause the input of comparator 35 to go positive (the negative data pulse voltage exceeding the reference voltage from potentiometer 37). This provides a positive going pulse at the output of comparator amplifier 35 which is applied to the trigger inputs of all sixteen flip-flops 41. However, at the same instant the particular cuvette number registered in counter 47 activates decoder 49 to apply an enabling pulse only to the particular corresponding number flip-flop 41, causing it to set and thereby apply a pulse to the corresponding numbered solenoid driver 53 which, in turn, activates the corresponding numbered pen 55 to mark the card 59 in the appropriate channel corresponding of the cuvette number. For example, assume that the highest transmittance value sample is located in cuvette position No. 1, the counter 47 will have registered one count and thus the decoder 49 will have an output on line 1. The data pulse will exceed the reference voltage and thus the output of comparator 35 will go positive for the duration of the data pulse. This causes the first one of flip-flops 41 to go set, thereby activating the No. 1 pen through the corresponding one-shot driver 53. Once a flip-flop 41 is set, it remains set until reset by the closing of contacts K1C. The one-shot drivers 53 are then only activated one time, even though the inputs from flip-flops 41 remain high throughout the remainder of the scan.

As pointed out above, the rotor pulse from detector 25 which is set to occur just prior to the reading of the No. 1 cuvette is used to reset the counter 47 to its initial state of an output of bit 1 to begin the synchronous count with the rotation of the rotor 7.

Accordingly, it will be seen that the scan continues until all the samples are read and carriage 57 of the recorder 56 reaches limit switch 71 and returns to the initial position, against limit switch 69. The flip-flops 41 are held inactive during the return of the carriage 57 by means of the ground applied through contacts K1C during the return travel of carriage 57 in order to prevent an erroneous activation of one of the pens 55.

It should be noted here that a logarithmically varying potentiometer 37 has been employed. It will be understood that by employing this potentiometer the transmittance values measured by the photomultiplier 27 output which varies linearly with transmittance values of thesamples the samples converted to an absorbance or concentration measurement since the carriage 57 moves linearly over the record card 59 with respect to the logarithmically varying reference voltage from the scanning potentiometer 37. Thus, considering the initial calibration of the system there is provided a direct recording of concentration of the samples which is determined by the distance a record print is made on the card from the lower or reference position of the carriage 57.

It will be understood that it would be obvious to those skilled in the art that other recordings could be made depending on the application. For example, the reference potentiometer 37 could be made to vary linearly and thereby provide a linear record of the data values without any transformation of the data. This feature contributes an inherent versatility in that changeover to other scales can be provided with little additional cost or complication.

Although the device has been illustrated for use with a sixteen station photometric analyzer, it is neither limited to this application alone nor to only sixteen channels or a train of sixteen repeating pulses. The device could be used for any number of pulses as long as the counter 47 and decoder 49 are arranged to provide a corresponding number of record channels.

What is claimed is:

1. An analog data recording apparatus for recording a plurality of data signals which are in the form of a continuously repeating train of electrical pulses of varying amplitude, comprising:
a comparator means for receiving said repeating train of pulses at an input thereof and comparing the amplitude of each of said pulses with a scanning reference voltage and providing a pulse at an output thereof each time the amplitude of one of said data signals exceeds said reference voltage;
a mechanically driven variable voltage source having an output connected to said comparator means for providing said scanning reference voltage;
means for generating reference pulses and repeatedly, sequentially apply each reference pulse to a plurality of separate outputs corresponding to the number of data signals of said repeating train of pulses;
a plurality of gating means equal to said plurality of outputs of said reference pulse generating means, each of said gating means having a trigger input commonly connected to the output of said comparator means and an enabling input connected to respective outputs of said reference pulse generating means for providing an output pulse at an output thereof the first time a pulse is applied to said input thereof from said reference pulse generating means in coincident with a pulse from said comparator means;
recorder means including a linearly movable carriage having a plurality of electrically operated markers, each of said markers having an input connected to respective outputs of said plurality of gating means;
a record medium disposed under said carriage; and
a drive means mechanically coupled to said carriage and said variable voltage source for synchronously moving said carriage over said record medium and adjusting the voltage output of said variable voltage source in a scanning mode, whereby each of said markers is activated to mark said record medium at a distance from a reference position on said record medium when the corresponding data signal exceeds said reference voltage level of said variable voltage source.

2. An analog data recording apparatus as set forth in claim 1 wherein said reference pulse generating means includes a binary counter and a binary decoder connected to respective binary stages of said counter and having a plurality of outputs which are activated separately in accordance with the binary count input.

3. An analog data recording apparatus as set forth in claim 2 further including means for providing a sync pulse just prior to the application of the first pulse of said repeating train of pulses and circuit means responsive to the application of said sync pulse for applying a reset pulse to a reset input of said counter.

4. An analog data recording apparatus as set forth in claim 3 wherein said switching means includes a plurality of flip-flops equal to said plurality of outputs of said decoder, each of said flip-flops having a trigger input connected to the output of said comparator means and an enabling input connected to corresponding output of said decoder so that when both said enabling input and said trigger input of one of said flip-flops are activated simultaneously said flip-flop is set providing a signal at a set output thereof, a plurality of one-shot drivers connected to corresponding set outputs of said plurality of flip-flops, each of said drivers having an output connected to corresponding inputs of said markers of said recorder means.

5. An analog data recording apparatus as set forth in claim 4 wherein said variable reference voltage source decreases from a known positive voltage and comparator means includes an amplifier for receiving negative going data pulses at an input thereof, a signal inverting comparator, a first summing resistor connected between the output of said amplifier and the input of said comparator, a second summing resistor connected between said variable reference source and the input of said comparator, said comparator having an output connected to said trigger inputs of said plurality of flip-flops, and a zener diode connected between the output of said comparator and ground so that the output of said comparator is clamped to ground as long as said reference voltage exceeds said negative going data pulses.

6. In combination with a high-speed photometric analyzer for measuring the transmission of light through a plurality of discrete samples disposed in a spinning rotor and oriented in a circular array about the center of rotation of said rotor wherein a photodetector is positioned so as to sense the light transmitted through said samples as the samples are rotated past the photodetector sensing position thereby generating a repeating train of data pulses whose amplitude is proportional to the light transmitted through said samples, an analog data recording apparatus for recording said train of data pulses in separate channels comprising:

a comparator means for receiving said repeating train of pulses at an input thereof and comparing the amplitude of each of said pulses with a scanning reference voltage and providing a pulse at an output thereof each time the amplitude of one of said data signals exceeds said reference voltage;

a mechanically driven variable voltage source having an output connected to said comparator means for providing said scanning reference voltage;

means for generating reference pulses and repeatedly, sequentially apply each reference pulse to a plurality of separate outputs corresponding to the number of data signals of said repeating train of pulses;

a plurality of gating means equal to said plurality of outputs of said reference pulse generating means, each of said gating means having a trigger input commonly connected to the output of said comparator means and an enabling input connected to respective outputs of said reference pulse generating means for providing an output pulse at an output thereof the first time a pulse is applied to said second input thereof from said reference pulse generating means in coincident with a pulse from said comparator means;

recorder means including a linearly movable carriage having a plurality of electrically operated markers, each of said markers having an input connected to respective outputs of said plurality of gating means;

a record medium disposed under said carriage; and a drive means mechanically coupled to said carriage and said variable voltage source for synchronously moving said carriage over said record medium and adjusting the voltage output of said variable voltage source in a scanning mode, whereby each of said markers is activated to mark said record medium at a distance from a reference position on said record medium when the corresponding data signal exceeds said reference voltage level of said variable voltage source.

7. The combination of claim 6 further including means for generating a sync pulse just prior to the passing of a first one of said samples past said sensing position and wherein said reference pulse generating means includes a binary counter, a binary decoder connected to respective binary stages of said counter and having a plurality of outputs which are activated separately in accordance with the binary count registered in said counter and a circuit means responsive to the application of said sync pulse for applying a reset pulse to a reset input of said counter.

8. The combination of claim 7 wherein said switching means includes a plurality of flip-flops equal to said plurality of outputs of said decoder, each of said flip-flops having a trigger input connected to the output of said comparator means and an enabling input connected to corresponding output of said decoder so that when both said enabling input and said trigger input of one of said flip-flops are activated simultaneously said flip-flop provides a signal at the output thereof, and a plurality of one-shot drivers connected to corresponding outputs of said plurality of flip-flops, each of said drivers having an output connected to corresponding inputs of said markers of said recorder means.

9. The combination of claim 8 wherein said variable reference voltage source decreases from a known positive voltage and comparator means includes an amplifier for receiving negative going data pulses at an input thereof, a signal inverting comparator, a first summing resistor connected between the output of said amplifier and the input of said comparator, a second summing resistor connected between said variable reference source and the input of said comparator, said comparator having an output connected to said trigger inputs of said plurality of flip-flops, and a zener diode connected between the output of said comparator and ground so that the output of said comparator is clamped to ground as long as said reference voltage exceeds said negative going data pulses.

10. The combination of claim 9 wherein said variable reference voltage source varies logarithmically with respect to the linear movement of said carriage so that the transmittance signals of said samples which vary logarithmically with absorbance of said samples are compared with a logarithmic reference voltage so as to provide a direct recording of absorbance values of said samples on said record medium.

* * * * *